United States Patent [19]

Skief

[11] Patent Number: 5,428,520
[45] Date of Patent: Jun. 27, 1995

[54] ADJUSTABLE PROTABLE UTILITY LIGHT STAND

[76] Inventor: Mark W. Skief, 6457 Quercus Grove Rd., Edwardsville, Ill. 62025

[21] Appl. No.: 285,154

[22] Filed: Aug. 3, 1994

[51] Int. Cl.$^6$ .................................................. F21S 1/12
[52] U.S. Cl. ................................... 362/427; 362/418; 362/431; 362/263; 362/269
[58] Field of Search ............... 362/418, 427, 429, 431, 362/263, 269, 424

[56] References Cited

U.S. PATENT DOCUMENTS

| | | | |
|---|---|---|---|
| D. 334,439 | 3/1993 | Meyer et al. | 362/418 |
| 3,790,773 | 2/1974 | Sapper | 362/426 |
| 4,121,280 | 10/1978 | Chapman et al. | 362/418 |
| 4,165,330 | 8/1979 | Sowden | 362/418 |
| 4,494,177 | 1/1985 | Mathews | 362/269 |
| 5,101,332 | 3/1992 | Hsia | 362/418 |
| 5,176,443 | 1/1993 | Lin | 362/427 |
| 5,333,103 | 7/1994 | Cvek | 362/427 |

Primary Examiner—Ira S. Lazarus
Assistant Examiner—Sara Sachie Raab

[57] ABSTRACT

A new and improved adjustable portable utility light stand with a triangular base having a base piece and two side pieces. The two side pieces are coupled together to form an apex. A tube is secured to the apex of the two side pieces and to the underside of the base piece. An inner tube is slidably secured within the tube. The inner tube serves as a stabilizer bar. A trapezoid segment has a lower portion, an upper portion, and two side portions. The lower portion is pivotally secured to the base piece of the triangular base. A middle segment has an upper portion, a lower portion, and two parallel side portions. The lower portion is pivotally secured to the upper portion of the trapezoid segment. An outer segment has an inner tube and an outer tube. The outer tube is pivotally secured to the upper portion of the middle segment. The inner tube is telescopically secured within the outer tube. A lamp segment is rotatably secured to the inner tube of the outer segment. A halogen lamp is pivotally secured to the lamp segment.

6 Claims, 5 Drawing Sheets

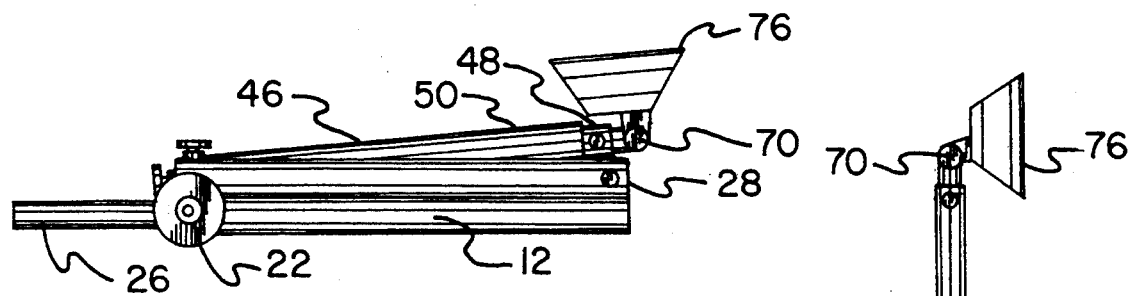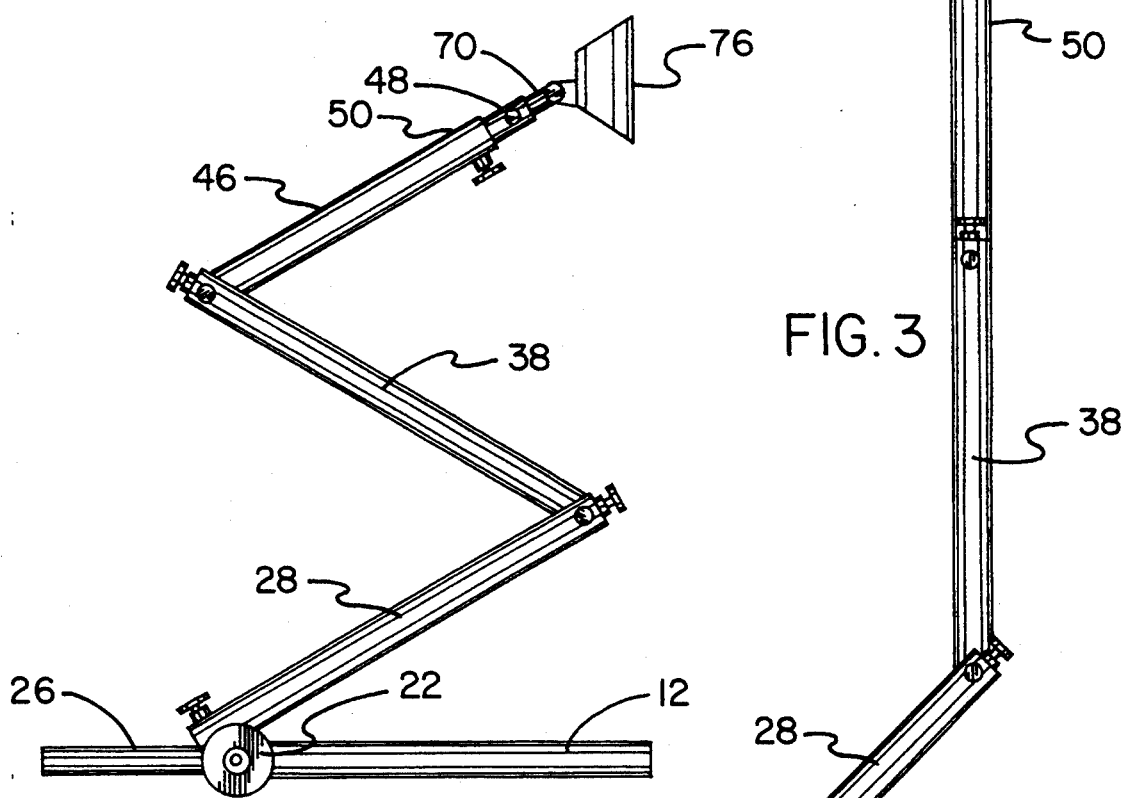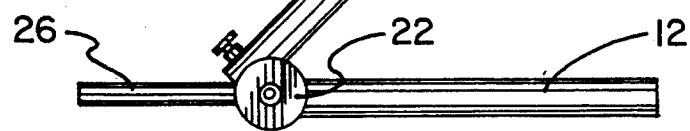

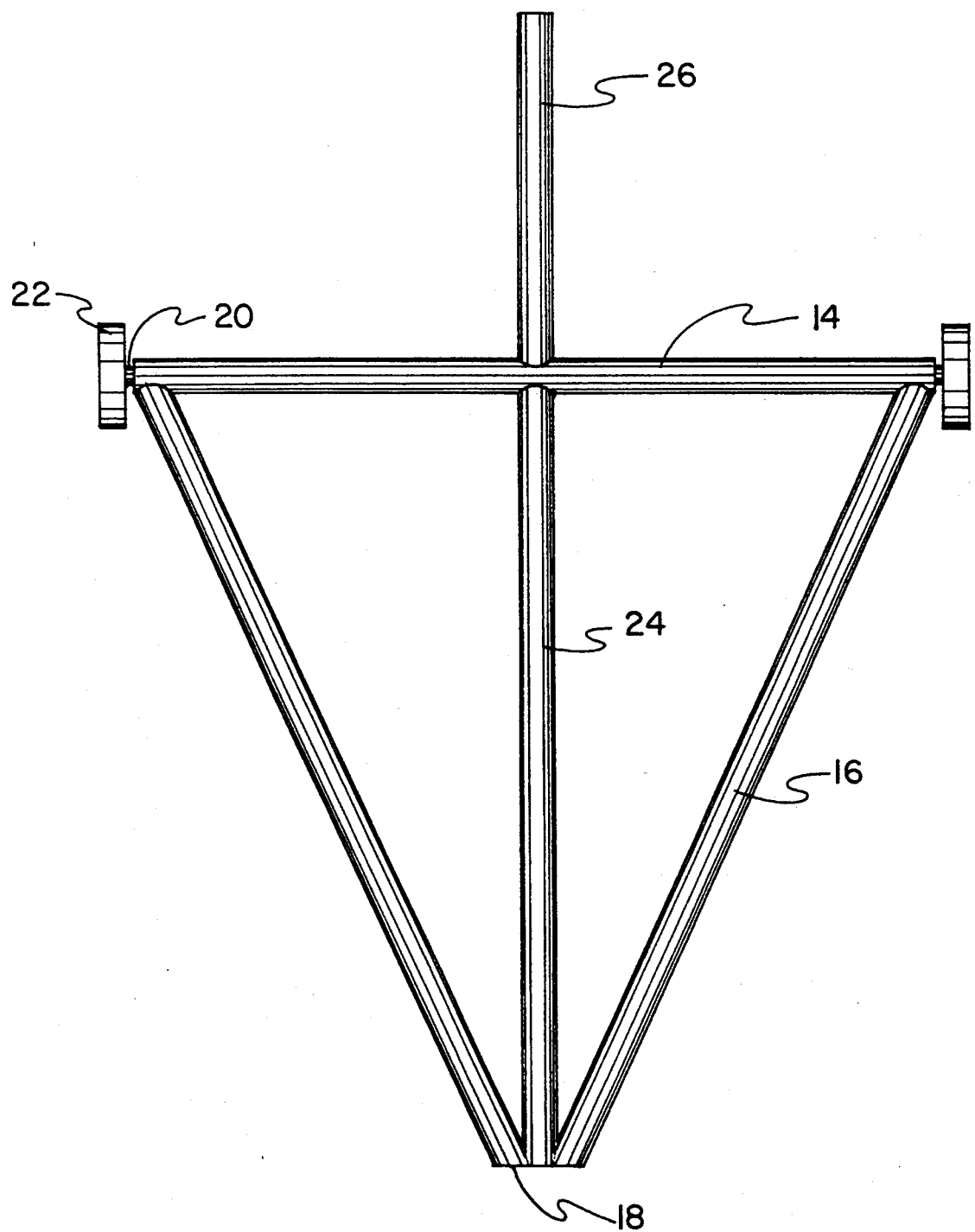
FIG. IA

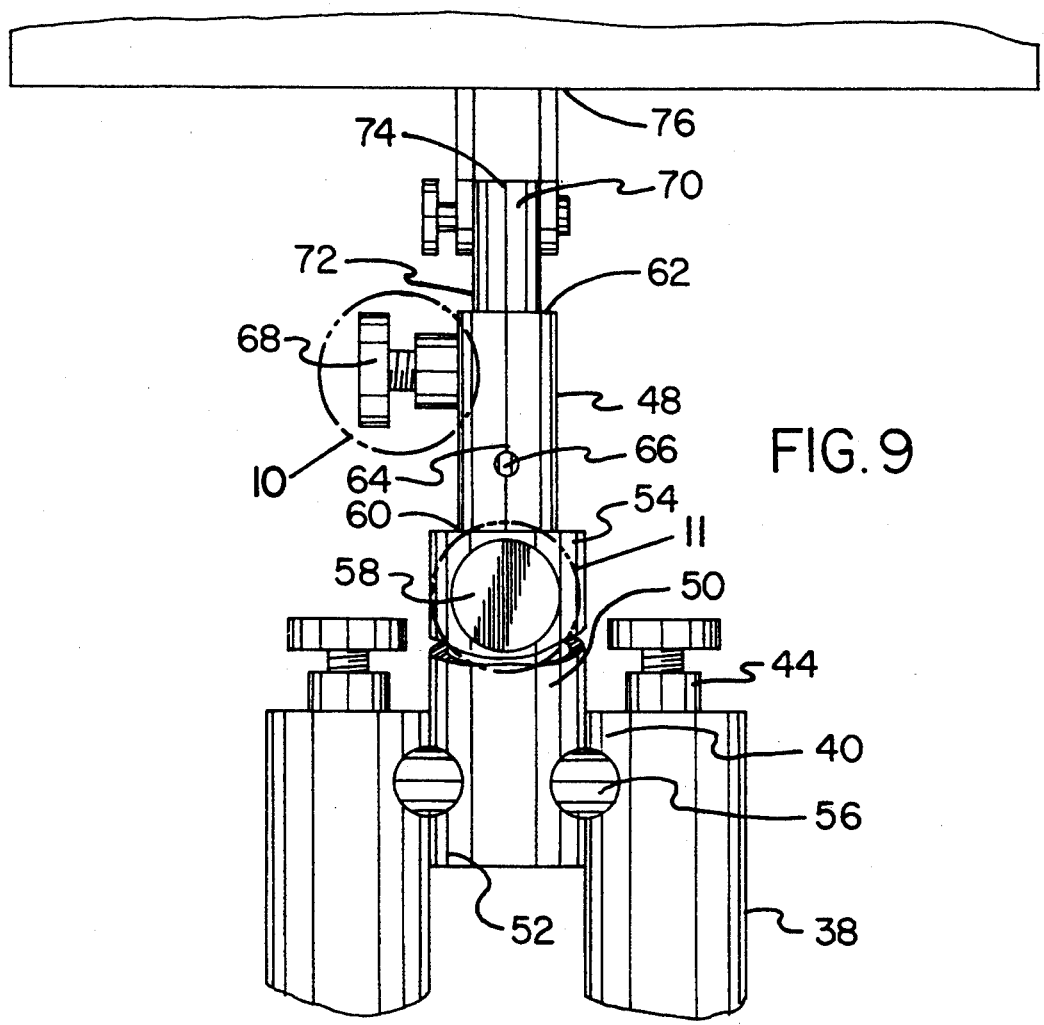
FIG. 9
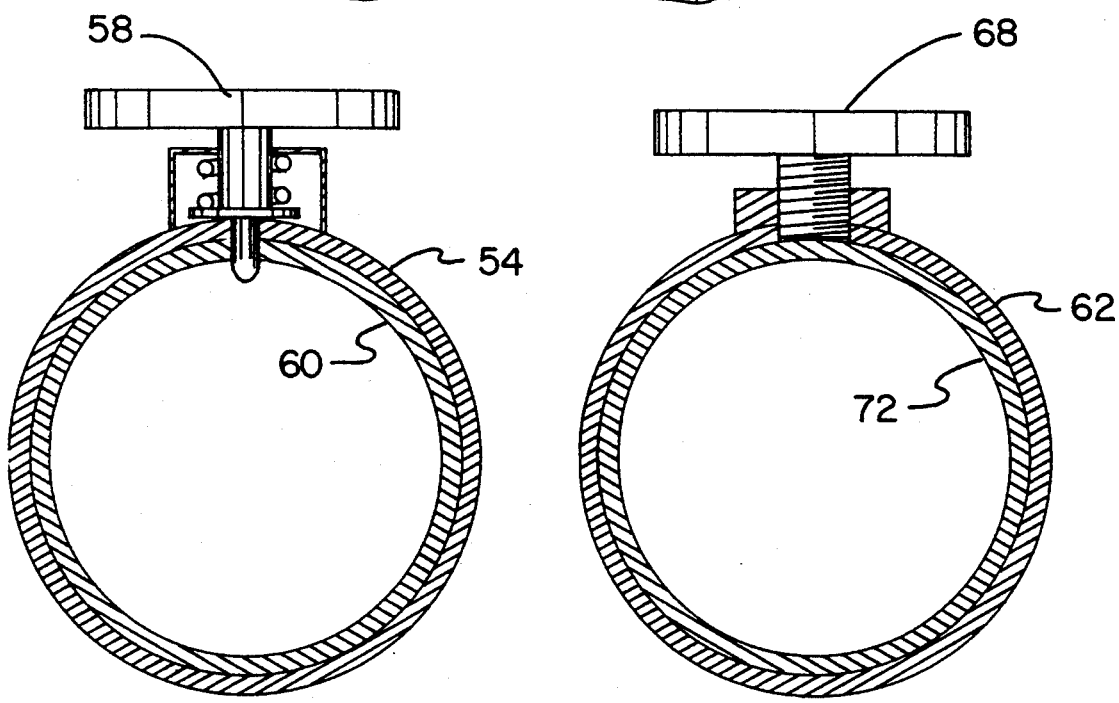
FIG. 10
FIG. 11

ADJUSTABLE PROTABLE UTILITY LIGHT STAND

BACKGROUND OF THE INVENTION

1. Field of the Invention

The present invention relates to an adjustable portable utility light stand and more particularly pertains to allowing the light to be closer to a working area with an adjustable portable utility light stand.

2. Description of the Prior Art

The use of articulated lamps is known in the prior art. More specifically, articulated lamps heretofore devised and utilized for the purpose of providing light are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,121,280 to Chapman et al. discloses an articulated light fixture.

U.S. Pat. No. Des. 334,439 to Meyer et al. discloses the ornamental design for an articulated arm for a task light.

U.S. Pat. No. 4,494,177 to Matthews discloses an articulated task lamp.

U.S. Pat. No. 4,165,530 to Sowden discloses an articulated-arm supporting member, especially for lamps.

U.S. Pat. No. 3,790,773 to Sapper discloses a lamp with an articulated support.

While these devices fulfill their respective, particular objective and requirements, the aforementioned patents do not describe an adjustable portable utility light stand that allows the light to be closer to a working area.

In this respect, the adjustable portable utility light stand according to the present invention substantially departs from the conventional concepts and designs of the prior art, and in doing so provides an apparatus primarily developed for the purpose of allowing the light to be closer to a working area.

Therefore, it can be appreciated that there exists a continuing need for a new and improved adjustable portable utility light stand which can be used for allowing the light to be closer to a working area. In this regard, the present invention substantially fulfills this need.

SUMMARY OF THE INVENTION

In the view of the foregoing disadvantages inherent in the known types of articulated lamps now present in the prior art, the present invention provides an improved adjustable portable utility light stand. As such, the general purpose of the present invention, which will be described subsequently in greater detail, is to provide a new and improved adjustable portable utility light stand and method which has all the advantages of the prior art and none of the disadvantages.

To attain this, the present invention essentially comprises a hollow triangular base having a base piece and two side pieces. The base piece has two end portions and an intermediate extent therebetween. The two side pieces each has a first end and a second end. Each first end is coupled with the two end portions of the base piece. Each second end is coupled together to form an apex. The base piece has an axle disposed therein. The axle extends outwardly of the two end portions. A pair of plastic wheels are secured to the outwardly extending axle. The hollow triangular base has a tube having a first end and an open second end. The first end is secured to the apex of the two side pieces. The open second end is secured to the underside of the base piece. An inner tube is slidably secured within the tube. The inner tube serves as a stabilizer bar. The device contains a hollow trapezoid segment having a lower portion, an upper portion, and two side portions. The lower portion has two hinge tubes thereon. The two hinge tubes have a locking means therein. The two hinge tubes are pivotally secured to the base piece of the hollow triangular base. The upper portion has two hooks secured thereon serving as extension cord holders. The device contains a hollow middle segment having an upper portion, a lower portion, and two parallel side portions. The lower portion has a hinge tube thereon. The upper portion has a hinge tube thereon. Each hinge tube has a locking means therein. The hinge tube of the lower portion is pivotally secured to the upper portion of the hollow trapezoid segment inward of the two hooks. The upper portion has two hooks secured thereon outward of the hinge tube. The device contains a hollow outer segment having an inner tube and an outer tube. The outer tube has a first end and second end. The first end has a short tube secured thereto. The short tube is pivotally secured to the hinge tube of the lapper portion of the hollow middle segment. The second end has a pull lock secured thereto. The inner tube has a first end, a second end, and an intermediate extent therebetween. The first end is telescopically secured within the outer tube. The intermediate extent has a plurality of apertures vertically aligned therein. The apertures cooperate with the pull lock of the outer tube to selectively lock the inner tube within the outer tube. The second end of the inner tube has a screw lock secured thereto. The device contains a lamp segment having a first end and a second end. The first end is rotatably secured to the second end of the inner tube of the hollow outer segment cooperating with the screw lock thereof. A halogen lamp is pivotally secured to the second end of the lamp segment.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable portable utility light stand which has all the advantages of the prior art articulated lamps and none of the disadvantages.

It is another object of the present invention to provide a new and improved adjustable portable utility light stand which may be easily and efficiently manufactured and marketed.

It is a further object of the present invention to provide a new and improved adjustable portable utility light stand which is of durable and reliable construction.

An even further object of the present invention is to provide a new and improved adjustable portable utility light stand which is susceptible of a low cost of manufacture with regard to both materials and labor, and which accordingly is then susceptible of low prices of sale to the consuming public, thereby making such an adjustable portable utility light stand economically available to the buying public.

Still yet another object of the present invention is to provide a new and improved adjustable portable utility light stand which provides in the apparatuses and methods of the prior art some of the advantages thereof, while simultaneously overcoming some of the disadvantages normally associated therewith.

Even still another object of the present invention is to provide a new and improved adjustable portable utility light stand for allowing the light to be closer to a working area.

Lastly, it is an object of the present invention to provide a new and improved adjustable portable utility light stand with a triangular base, having a base piece and two side pieces. The two side pieces are coupled together to form an apex. A tube is secured to the apex of the two side pieces and to the underside of the base piece. An inner tube is slidably secured within the tube. The inner tube serves as a stabilizer bar. A trapezoid segment has a lower portion, an upper portion, and two side portions. The lower portion is pivotally secured to the base piece of the triangular base. A middle segment has an upper portion, a lower portion, and two parallel side portions. The lower portion is pivotally secured to the upper portion of the trapezoid segment. An outer segment has an inner tube and an outer tube. The outer tube is pivotally secured to the upper portion of the middle segment. The inner tube is telescopically secured within the outer tube. A lamp segment is rotatably secured to the inner tube of the outer segment. A halogen lamp is pivotally secured to the lamp segment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the adjustable portable utility light stand constructed in accordance with the principles of the present invention.

FIG. 2 is an side view of the present invention illustrating partial extension.

FIG. 3 is a side view of the present invention illustrating partial extension.

FIG. 9 is an enlarged view of the outer segment in relation to the middle segment.

FIG. 10 is an enlarged view as seen along line 10 of FIG. 9.

FIG. 11 is an enlarged view as seen along line 11 of FIG. 9.

The same reference numerals refer to the same parts through the various Figures.

DESCRIPTION OF THE PREFERRED EMBODIMENT

Figure 4:
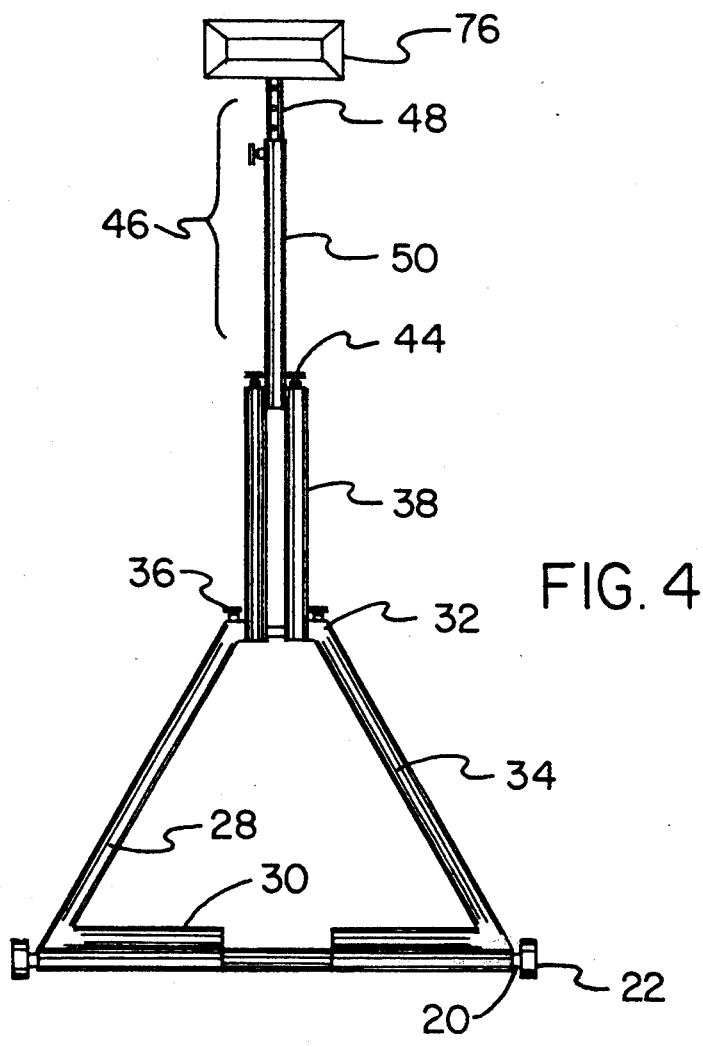
FIG. 4 is a front view of the present invention illustrating partial extension.
Figure 5:
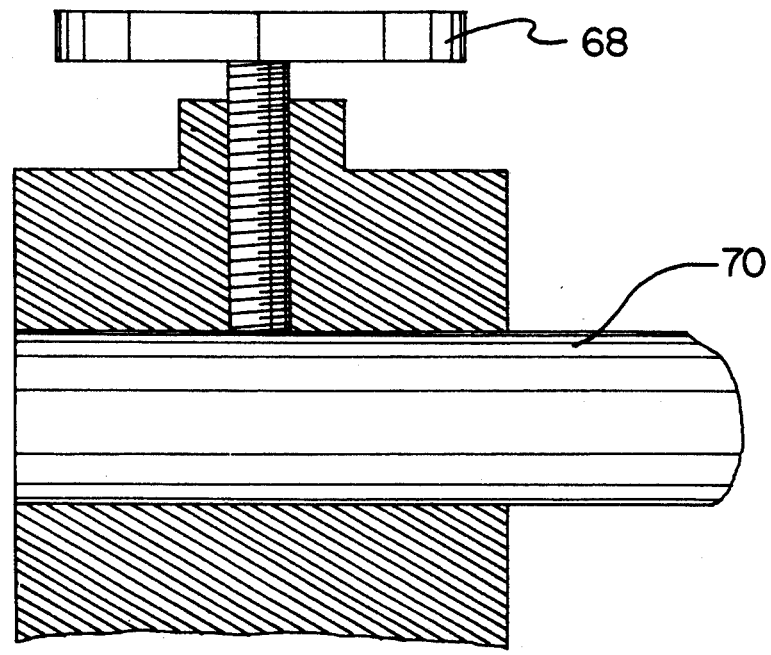
FIG. 5 is an enlarged view of the securement means of the middle segment.
Figure 6:
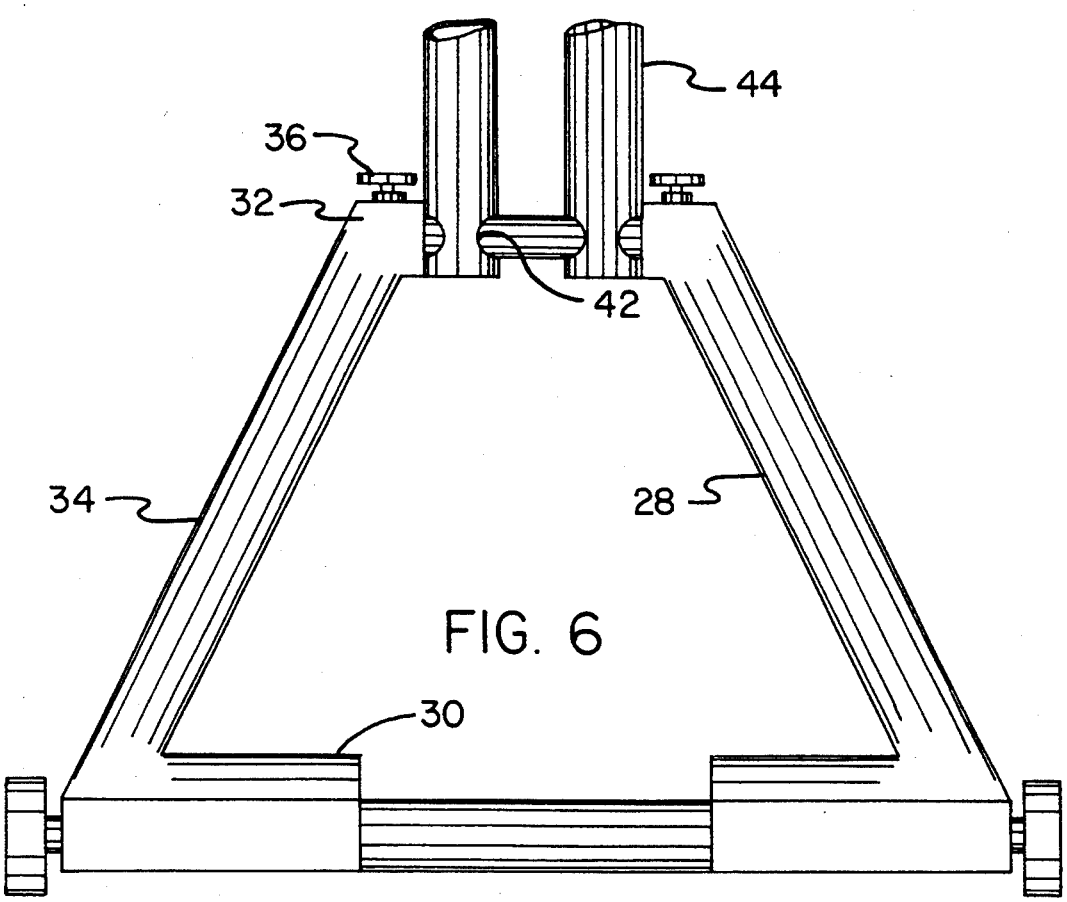
FIG. 6 is a front view of the present invention illustrating the trapezoid segment.

With reference now to the drawings, and in particular, to FIG. 1 thereof, the preferred embodiment of the new and improved adjustable portable utility light stand embodying the principles and concepts of the present invention and generally designated by the reference number 10 will be described.

Specifically, it will be noted in the various Figures that the device relates to a new and improved adjustable portable utility light stand for allowing the light to be closer to a working area. In its broadest context, the device consists of a hollow triangular base, a hollow trapezoid segment, a hollow middle segment, a hollow outer segment, a lamp segment, and a halogen lamp.

The device 10 contains a hollow triangular base 12 having a base piece 14 and two side pieces 16. The base piece 14 is longer than the two side pieces 16. The base piece 14 has two end portions and an intermediate extent therebetween. The two side pieces 16 each has a first end and a second end. Each first end is coupled with the two end portions of the base piece. Each second end is coupled together to form an apex 18. The apex 18 is truncated and is extended about 20 to 25" from the base piece 14. The base piece 14 has an axle 20 disposed therein. The axle 20 extends outwardly of the two end portions. A pair of plastic wheels 22 are secured to the outwardly extending axle 20. The plastic wheels 22 allow the device 10 to be easily transported on the ground. The hollow triangular base 12 has a tube 24 having a first end and an open second end. The first end is secured to the apex 18 of the two side pieces 16. The open second end is secured to the underside of the base piece 14. The tube 24 bisects the hollow triangular base 12. An inner tube 26 is slidably secured within the tube. The inner tube 26 serves as a stabilizer bar. The stabilizer bar prevents the device 10 from falling over when incorporated in its variety of positions.

The device 10 contains a hollow trapezoid segment 28 having a lower portion 30, an upper portion 32, and two side portions 34. The lower portion 30 has two hinge tubes thereon. The two hinge tubes have a locking means therein. The two hinge tubes are pivotally secured to the base piece 14 of the hollow triangular base 12. The hinge tubes allow the trapezoid segment 28 to be folded into the triangular base 12 for storage or extended perpendicular to the triangular base 12 or to any point in between the two extremes. The upper portion 32 has two hooks 36 secured thereon serving as extension cord holders. An optional carrying handle can be incorporated into the device 10 by securing the handle to one of the two side portions 34.

The device 10 contains a hollow middle segment 38 having an upper portion 40, a lower portion 42, and two parallel side portions 44. The lower portion 42 has a hinge tube thereon. The upper portion 40 has a hinge tube thereon. Each hinge tube has a locking means therein. The hinge tube of the lower portion 42 is pivotally secured to the upper portion 32 of the hollow trapezoid segment 28 inward of the two hooks 36. The hinge tube of the lower portion 42 allows the middle segment 38 to be folded into the trapezoid segment 28 or to an extended position integral with the trapezoid segment 28. The upper portion 40 has two hooks 44 secured thereon outward of the hinge tube.

The device 10 contains a hollow outer segment 46 having an inner tube 48 and an outer tube 50. The outer tube 50 has a first end 52 and second end 54. The first end 52 has a short tube 56 secured thereto. The short tube 56 is pivotally secured to the hinge tube of the upper portion 40 of the hollow middle segment 38. This allowing the short tube 56 to be folded within the middle segment 38 or to an extended position integral with the middle segment 38 or any position between the two extremes. The second end 54 has a pull lock 58 secured thereto. The inner tube 48 has a first end 60, a second end 62, and an intermediate extent 64 therebetween. The first end 60 is telescopically secured within the outer tube 50. The intermediate extent 64 has a plurality of apertures 66 vertically aligned therein. The apertures 66 cooperate with the pull lock 58 of the outer tube 50 to selectively lock the inner tube 48 within the outer tube 50. The pull lock 58 allows the user to adjust the height of the inner tube 48 as it extends out of the outer tube 50. The second end 62 of the inner tube 48 has a screw lock 68 secured thereto.

The device 10 contains a lamp segment 70 having a first end 72 and a second end 74. The first end 72 is rotatably secured to the second end 62 of the inner tube 48 of the hollow outer segment 46 cooperating with the screw lock 68 thereof. The screw lock 68 of the inner tube 48 allows the user to position the lamp segment 70 at any angle desired.

A halogen lamp 76 is pivotally secured to the second end 74 of the lamp segment 70. The halogen lamp 76 can be pivoted up or down to better illuminate an area. The halogen lamp 76 is preferred over incandescent bulbs because they provide a much stronger illumination.

Figures 7, 8:
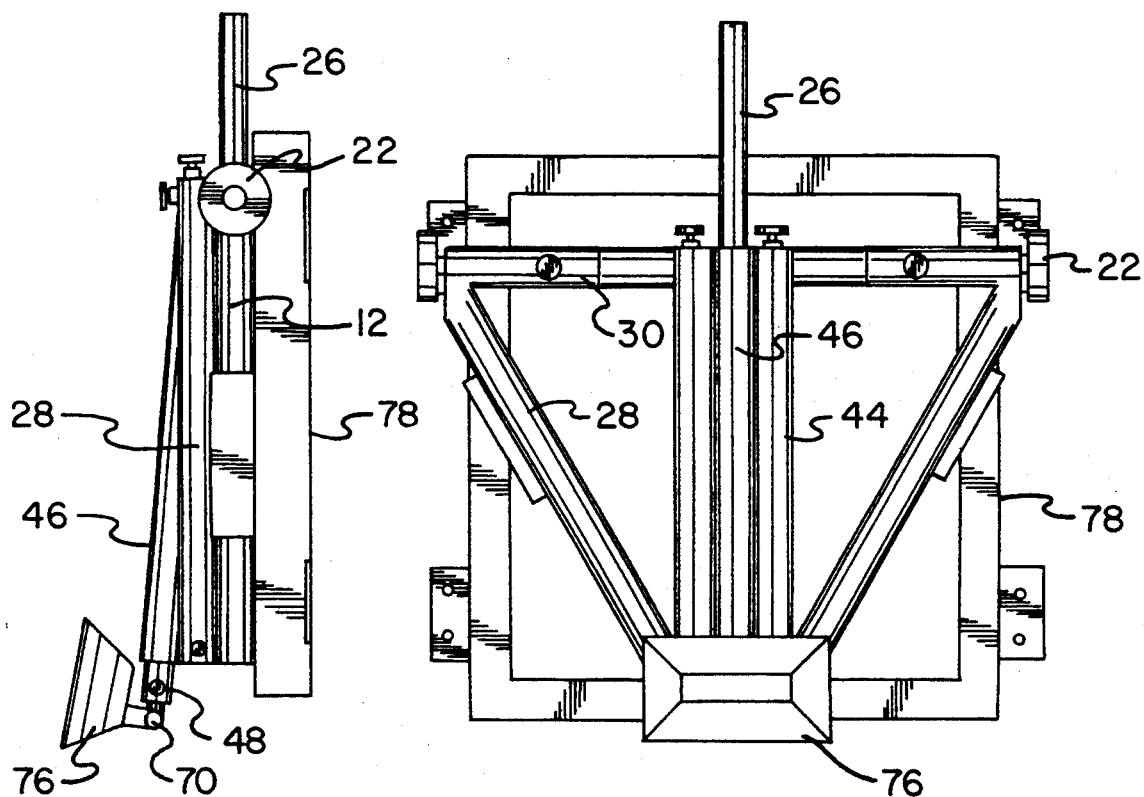
FIG. 7 is a side view of the present invention in place on the wall mounting bracket.
FIG. 8 is a plan view of the present invention in place on the wall mounting bracket.

A second embodiment of the present invention is shown in FIG. 8 and FIG. 9 and includes substantially all of the components of the present invention further including a wall mounting bracket 78 having a first side and a second side. The first side is mountable on a wall. The second side removably receives the hollow triangular base 12. The wall mounting bracket 78 provides a means for securing the device 10 to a wall for a more permanent fixture, but the bracket 78 allows the device 10 to be easily removed for use in other areas.

People often have to work in dark areas where the lighting is inadequate or missing. They usually bring a portable electric light source into the area to provide enough light, but this often uses incandescent bulbs and/or is not sufficient. Portable lights can seldom be placed where they provide the best illumination, and are frequently housed in flimsy stands that are easily knocked over. The present invention is a better source of temporary illumination that overcomes these drawbacks. It uses one or two quartz halogen bulbs in reflector holders to provide bright light over a wide area. It folds up for storage, and extends up to 8' at various angles. It can fit into a wall mount for use over a regular area, and if needed elsewhere can be lifted out and rolled on a pair of wheels. When unfolded it can be adjusted to different heights, extensions, and angles to get into and/or illuminate confined spaces.

The present invention consists of a base and three welded tubular segments that telescope or fold together for storage. All sections are permanently joined together by hinges made of inner and outer tubes. The base is triangular, with an axle on its longer side that is 32 inches to 36 inches long, including 2 inches on the ends for 7½ inches plastic wheels. The other two sides are bent or truncated near their apex, and extend about 20 inches to 25 inches from the axle. A tube bisects the triangle, from the confluence of the sides to the underside of the axle. A smaller diameter tube that acts as a stabilizer bar slides inside the central tube, and a locking mechanism holds it in place, either extended or retracted.

A trapezoid that almost matches the base triangle in size and shape is the first segment. It is attached to the axle by two short hinge tubes which go around the axle and are welded to the base of the trapezoid so that they are just inside the sides of the base. They allow the trapezoid to fold flat on the base or be raised up 90 degrees or more. Each hinge tube has a screw-type locking mechanism that can lock the trapezoid in any position. An optional carrying handle may be attached to one side at the center.

The middle segment has a hinge tube surrounding the top of the trapezoid. Two parallel tubes that are almost as long as the stabilizer bar are welded to either end of the hinge tube and a screw lock is attached at its center on the opposite side. The electric cord may be wrapped around a pair of hooks on the outside of each tube. The upper end of each parallel tube has a short piece of tubing welded across it to act as the hinge tubes for the outer segment. These have screw locks in their middle.

The outer segment is composed of two telescoping tubes. The outer tube has a short tube welded across its inner end which fits into the hinge tubes on the ends of the middle segment, and a screw lock at the other end which can clamp the inner tube at any length to which it is extended. The inner tube also has a screw lock at its end which allows the lamp support tube to be rotated and fixed in any direction. The lamp support tube has a short segment welded perpendicularly to its center. Each end supports a lamp assembly which can be rotated up or down.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved adjustable portable utility light stand for allowing the light to be closer to a working area comprising, in combination:

a hollow triangular base having a base piece and two side pieces, the base piece having two end portions and an intermediate extent therebetween, the two side pieces each having a first end and a second end, each first end coupled with the two end portions of the base piece, each second end coupled together to form an apex, the base piece having an axle disposed therein, the axle extending outwardly of the two end portions, a pair of plastic wheels secured to the outwardly extending axle, a tube having a first end and an open second end, the first end secured to the apex of the two side pieces, the open second end secured to the underside of the base piece, an inner tube slidably secured within the tube, the inner tube serving as a stabilizer bar;

a hollow trapezoid segment having a lower portion, an upper portion, and two side portions, the lower portion having two hinge tubes thereon, the two hinge tubes having a locking means therein, the two hinge tubes pivotally secured to the base piece of the hollow triangular base, the upper portion having two hooks secured thereon serving as extension cord holders;

a hollow middle segment having an upper portion, a lower portion, and two parallel side portions, the lower portion having a hinge tube thereon, the upper portion having a hinge tube thereon, each hinge tube having a locking means therein, the hinge tube of the lower portion pivotally secured to the upper portion of the hollow trapezoid segment inward of the two hooks, the upper portion having two hooks secured thereon outward of the hinge tube;

a hollow outer segment having an inner tube and an outer tube, the outer tube having a first end and second end, the first end having a short tube secured thereto, the short tube pivotally secured to the hinge tube of the upper portion of the hollow middle segment, the second end having a pull lock secured thereto, the inner tube having a first end, a second end, and an intermediate extent therebetween, the first end telescopically secured within the outer tube, the intermediate extent having a plurality of apertures vertically aligned therein, the apertures cooperating with the pull lock of the outer tube to selectively lock the inner tube within the outer tube, the second end of the inner tube having a screw lock secured thereto;

a lamp segment having a first end and a second end, the first end rotatably secured to the second end of the inner tube of the hollow outer segment cooperating with the screw lock thereof; and a halogen lamp pivotally secured to the second end of the lamp segment.

2. The device as described in claim 1 and further including wherein a handle secured to one of the two side portions of the hollow trapezoid segment.

3. The device as described in claim 2 and further including wherein a wall mounting bracket having a first side and a second side, the first side being mountable on a wall, the second side removably receiving the hollow triangular base.

4. An adjustable portable utility light stand comprising:

a hollow triangular base having a base piece and two side pieces, the two side pieces coupled together to form an apex, a tube secured to the apex of the two side pieces and secured to the underside of the base piece, an inner tube slidably secured within the tube, the inner tube serving as a stabilizer bar;

a hollow trapezoid segment having a lower portion, an upper portion, and two side portions, the lower portion pivotally secured to the base piece of the hollow triangular base;

a hollow middle segment having an upper portion, a lower portion, and two parallel side portions, the lower portion pivotally secured to the upper portion of the hollow trapezoid segment;

a hollow outer segment having an inner tube and an outer tube, the outer tube pivotally secured to the upper portion of the hollow middle segment, the inner tube telescopically secured within the outer tube;

a lamp segment rotatably secured to the inner tube of the hollow outer segment; and a halogen lamp pivotally secured to the lamp segment.

5. The device as described in claim 4 and further including wherein the base piece of the hollow triangular base having an axle disposed therein, the axle having two end portions extending outwardly therefrom.

6. The device as described in claim 5 and further including wherein a pair of plastic wheels secured to the two end portions of the axle.

* * * * *